United States Patent
Vaughn et al.

(10) Patent No.: US 6,534,442 B1
(45) Date of Patent: *Mar. 18, 2003

(54) PROCESS FOR PRODUCTION OF CARBONACEOUS CHARS HAVING CATALYTIC ACTIVITY

(75) Inventors: Robert H. Vaughn, Bethel Park, PA (US); Keith R. Nicholson, Munhall, PA (US); Toan P. Vo, Upper St. Clair, PA (US)

(73) Assignee: Caigon Carbon Corporation, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/354,178

(22) Filed: Jul. 16, 1999

Related U.S. Application Data

(63) Continuation-in-part of application No. 09/079,424, filed on May 14, 1998, now Pat. No. 6,342,129.

(51) Int. Cl.⁷ .............................................. C01B 31/12
(52) U.S. Cl. .................................. 502/423; 204/157.47
(58) Field of Search ..................... 423/445 R; 502/423; 204/157.47; 205/555

(56) References Cited

U.S. PATENT DOCUMENTS

| 4,052,292 A | * | 10/1977 | Espenscheid et al. .......... 208/8 |
| 5,488,023 A | * | 1/1996 | Gadkaree et al. ........... 502/182 |
| 5,733,515 A | * | 3/1998 | Doughty et al. ............ 423/210 |

* cited by examiner

Primary Examiner—Stuart L. Hendrickson
(74) Attorney, Agent, or Firm—Cohen & Grigsby, P.C.

(57) ABSTRACT

A process is provided for the production of a catalytically active carbonaceous char. By this process, a nitrogen-containing compound is combined with an uncarbonized nitrogen-poor carbon-containing material. The resulting mixture is then carbonized and oxidized at temperatures less than 500° C. The resulting char is next heated to temperatures greater than 500° C and subsequently activated with $H_2O$, $CO_2$, or $O_2$, singly or in any combination, to result in the catalytically active carbonaceous char. The resulting catalytically active carbonaceous char has utility for the chemical conversion of peroxides, hydrides, $SO_X$, $NO_X$, and chloramines in liquid and/or gaseous media.

18 Claims, No Drawings

US 6,534,442 B1

PROCESS FOR PRODUCTION OF CARBONACEOUS CHARS HAVING CATALYTIC ACTIVITY

CROSS REFERENCE

This is a continuation-in-part of U.S. patent application Ser. No. 09/079,424, filed May 14, 1998 now U.S. Pat. No. 6,342,129.

FIELD OF THE INVENTION

The present invention relates to a process for the production of a catalytically active carbonaceous char, and in particular to a catalytically active char produced at low temperatures and activated at high temperature.

BACKGROUND OF THE INVENTION

The use of carbonaceous chars as catalysts in chemical reactions is well known. Applications that use catalytic chars to improve reaction rate include, but are not limited to $NO_x$ reduction, $SO_x$ oxidation, chloramine removal, glyphosate production, peroxide destruction, and metalloid and non-metalloid hydride oxidation. In many of these applications the rate of reaction can be affected by the degree of catalytic activity of the char.

The known techniques for increasing the catalytic activity of carbonaceous chars can generally be categorized into three approaches. One approach involves treating a high-temperature carbonaceous char after the completion of the thermal processing used to produce the char. High-temperature carbonaceous chars, as referred to in this disclosure, are those produced at temperatures equal to or greater than 700° C. Examples of such high-temperature chars are activated carbon and charcoal. Chars produced at temperatures below 700° C. are referred to as low-temperature chars. In one example of this prior art, a high-temperature char is impregnated with metal ions to improve the catalytic performance of the char in $NO_x$ removal applications. It is also known that exposing activated carbon to ammonia in an oxidizing environment increases the catalytic activity of the carbon. Similarly, oxidizing an activated carbon, followed by inert heat treatment to drive off the oxygen-containing groups from the surface of the carbon enhances the catalytic performance in $SO_2/SO_3$ conversion. It is known furthermore that the catalytic oxidative activity of an activated carbon is improved by first oxidizing the carbon and then heating the oxidized carbon in the presence of nitrogen-containing compounds such as urea or melamine.

A second approach for increasing the catalytic activity of carbonaceous chars begins with a carbonaceous feedstock which is inherently suitable to yield a high degree of catalytic activity in the final carbonaceous chars. Such a feedstock is simply thermally processed to produce the catalytically active chars. Those skilled in the art are aware that the catalytic activity is affected by the nitrogen content of the feedstock. For example, pure nitrogen-rich compounds such as hexamethylenetetramine, polyacrylonitrile, or gelatin will, when carbonized and activated, produce carbonaceous chars with catalytic activity. Additionally, admixing ammonium salts with inherently nitrogen-poor feedstock, followed by carbonizing and activating, is known to improve $NO_x$ reduction performance of the char beyond what is achieved without the addition of the ammonium salts. Similar improvements in the decomposition of hydrogen peroxide are realized with a char made by admixing a nitrogen-containing compound such as urea with a nitrogen-poor feedstock such as sucrose prior to carbonizing and activating.

A more recent approach for increasing the catalytic activity of carbonaceous chars involves modifications to the thermal processes used to produce the chars. Catalytic activity has been significantly enhanced by carbonization and oxidation of a nitrogen-poor bituminous material followed by impregnation of the resultant low-temperature char with a nitrogen-containing compound prior to or during exposure of the char to temperatures of 700° C. or greater. The resultant high-temperature carbonaceous char may then be activated to the desired degree by any known technique. In this approach, the benefit of extensive oxidation of the carbonized product prior to impregnation with a nitrogen-containing compound is taught.

The relative catalytic activity of carbonaceous chars has been shown to be accurately and conveniently classified by determining the ability of the chars to catalyze the decomposition of hydrogen peroxide in an aqueous solution, as set forth in U.S. Pat. No. 5,470,748 (1995). The decomposition reaction is exothermic and, therefore, causes an increase in the temperature of the solution. Under a defined set of conditions, the elapsed time to achieve 75% of the temperature change resulting from complete decomposition of the hydrogen peroxide, or "t-¾ time", depends solely on the ability of a char to catalyze the hydrogen peroxide decomposition reaction. For instance, two chars may exhibit similar physical adsorptive capacity measured in terms of the Iodine Number, for example, yet have significantly different t-¾ times. Iodine Number is described in Test Method TM-4 of Calgon Carbon Corporation, Pittsburgh, Pa., and is an indication of the available surface area of the char for adsorption. Chars having low t-¾ values are known to be useful for $NO_x$ reduction, $SO_2$ oxidation, chloramine removal, glyphosate production, peroxide destruction, and metalloid and non-metalloid hydride oxidation.

Thus, it is known that the peroxide decomposition ability of a char made from a nitrogen-poor carbonaceous feedstock can be improved by combining said feedstock with nitrogen-containing compounds prior to thermal processing. It is also known that carbonizing a nitrogen-poor carbonaceous feedstock under an oxidizing environment, followed by impregnating the oxidized carbonized product with a nitrogen-containing compound, will enhance peroxide decomposition ability of the final activated char. However, it is not taught by, nor can it be inferred from, the prior art that combining a nitrogen-rich compound with a nitrogen-poor carbonaceous feedstock, and then carbonizing the mixture in an oxidizing environment, will enhance the hydrogen peroxide decomposition ability of the final activated char beyond that achieved without said oxidizing environment or, conversely, without said addition of nitrogen-containing compound. The principal disadvantage expected in such a process would be the oxidation and loss of the nitrogen-containing compound prior to high-temperature treatment, and the consequent need for large amounts of these materials during processing to confer the requisite catalytic activity to the final product. If a unique and significant t-¾ benefit could be obtained from such a process using relatively small amounts of the nitrogen-containing compound, the process would have significant cost and performance advantages over the prior art. For example, those prior art methods which rely on treatment with added metals to produce catalytic activity impose a cost burden due to special handling and disposal procedures associated with the metals. Prior art methods which rely on the use of pure nitrogen-rich compounds as feedstocks also bear a cost burden due to the high cost of the feedstock and to the hazard created by large amounts of cyanide and other toxic materials which are invariably produced during thermal processing. Furthermore, prior art processes that use high temperature chars, such as activated carbons and charcoals, as feedstocks are inherently more costly because of the additional process steps needed to confer catalytic activity to the final product.

Accordingly, it is an object of the present invention to provide an improved low-cost process for the production of carbonaceous chars having improved catalytic activity that are made from nitrogen-poor feedstocks without the use of added metals or post-treatments of high-temperature chars. It is a further object of the present invention to provide these improved cost and performance advantages through relatively minor and low-cost modifications of both the feedstock and the processing conditions typically used to make high temperature chars.

SUMMARY OF THE INVENTION

The present invention comprises a method for the production of carbonaceous chars having significant catalytic activity from nitrogen-poor feedstocks that are treated at low-temperatures.[1] The method of the present invention includes the steps of treating a nitrogen-poor carbonaceous feedstock by combining or contacting said nitrogen-poor carbonaceous feedstock with a nitrogen-containing compound or material, carbonizing the treated carbonaceous feedstock at temperatures less than 500° C. in an oxidizing environment, and then activating the resultant carbonized and oxidized product at temperatures greater than 500° C. The present invention does not require large amounts of the nitrogen-containing compound to confer a significant level of catalytic activity in the final product. In addition, it was discovered that for a given amount of the nitrogen-containing compound, higher levels of oxidation initially can confer higher levels of catalytic activity to the final product. Oxidation of said treated carbonaceous feedstock can be effected during or after carbonization and is optionally conducted to a level that is typically well beyond the requirements of activated carbon manufacture. The resultant activated carbonaceous char has been found to have appreciable catalytic activity. Furthermore, any of the known processes or methods for production of catalytically active low-temperature carbonaceous chars can be incorporated into the present invention to further enhance the catalytic activity of the resultant char.

[1] As used herein the term low temperature carbonaceous char includes the carbonaceous char prepared in accordance with the present invention which is activated at a temperature in excess of 600° C., e.g., activated catalytically active low temperature char.

In practice, the amount of the nitrogen-containing compound used in the present invention is typically small, preferably less than 15% by weight of the carbon-containing material or, alternatively, an amount such that the desired level of catalytic activity is exhibited by the resultant activated catalytically active carbonaceous char.

Carbon-containing materials suitable for use in the present invention include, but are not limited to, coals having a wide range of properties usually measured by persons having ordinary skill in the art of coal usage, peat, wood, nut shells, and fruit pits. In a preferred embodiment of the invention, the carbon containing material is coal. The nitrogen-containing compound is any organic or inorganic nitrogen-containing compound. Examples of such nitrogen containing compounds include urea, melamine, ammonia, ammonium hydroxide, ammonium salts, amines, aniline, gelatin, and polyacrylonitrile. When the nitrogen-containing compound is in the solid form, the carbon-containing material and the nitrogen-containing compound, can be pulverized together with a suitable binder such as pitch, if necessary or desired, and the resultant pulverized product is formed into granules, disks, spheres, pellets or like physical forms. The resultant formed material is then carbonized and oxidized by heating in an oxidizing environment to temperatures less than 500° C. In another preferred embodiment of the present invention, the carbon-containing material, in the form of pieces or granules, is brought into contact with the nitrogen-containing material before or during the carbonization and oxidation step. The resulting low-temperature carbonaceous char is then thermally activated by exposing the char to one or more of $H_2O$, $CO_2$, or $O_2$ at temperature greater than 500° C. The duration of said exposure is selected such that the resultant activated carbonaceous char exhibits an Iodine Number greater than 200 mg/g, where Iodine Number is determined in accordance with Test Method TM-4 of Calgon Carbon Corporation, Pittsburgh, Pa., and is an indication of the available adsorptive surface area of the char.

In another preferred embodiment of the invention, the carbonaceous material is a coal to which less than 15% by weight of a nitrogen-containing compound having at least one nitrogen functionality in which the nitrogen exhibits an oxidation number of less than zero is added. These materials can be pulverized together with a suitable binder such as pitch, if necessary or desired, and the pulverized product is formed into granules, disks, spheres, pellets, or like physical forms. The resultant formed material is then carbonized by heating in an oxidizing environment to temperature less than 400° C. The resulting low-temperature carbonaceous char is then thermally activated by exposure of the char to any combination of $H_2O$, $CO_2$, or $O_2$ at temperature greater than 500° C. The duration of said exposure is selected such that the resultant activated carbonaceous char exhibits an Iodine Number greater than 400 mg/g, where Iodine Number is determined in accordance with Test Method TM-4 of Calgon Carbon Corporation, Pittsburgh, Pa., and is an indication of the available adsorptive surface area of the char.

In another preferred embodiment of the invention, the carbonaceous material is a coal to which less than 5% by weight of a nitrogen containing compound having at least one nitrogen functionality in which the nitrogen exhibits an oxidation number of less than zero is added. These materials can be pulverized together with a suitable binder such as pitch, if necessary or desired, and the pulverized product is formed into granules, disks, spheres, pellets, or like physical forms. The resultant formed material is then carbonized by heating in an oxidizing environment at temperature less than 400° C. The resulting low-temperature carbonaceous char is then thermally activated by exposure of the char to any combination of $H_2O$, $CO_2$, or $O_2$ at temperature greater than 500° C. The duration of said exposure is selected such that the resultant activated low-temperature carbonaceous char exhibits an Iodine Number greater than 600 mg/g, where Iodine Number is determined in accordance with Test Method TM-4 of Calgon Carbon Corporation, Pittsburgh, Pa., and is an indication of the available adsorptive surface area of the char.

PRESENTLY PREFERRED EMBODIMENTS

The following examples illustrate preferred embodiments of the present invention. In general, the examples demonstrate that the present invention may be practiced with a variety of carbonaceous feedstocks and nitrogen containing compounds. Furthermore, Examples 4 and 5 illustrate the importance of oxidation during carbonization to impart, after subsequent activation, a high peroxide decomposition catalytic activity to the resultant char.

EXAMPLE 1

A bituminous coal and 4 weight % pitch were pulverized together and subsequently briquetted. The resultant briquettes were crushed and sized to approximately less than 6 mesh size and greater than 20 mesh size (U.S. Standard Series sieves). In the presence of large quantities of excess air, the formed and sized material was carbonized and oxidized by heating from 150° C. to 450° C. at a rate of 100° C./hour and maintaining the temperature at 450° C. for three additional hours. The carbonization and oxidation were carried out in a rotary kiln. Any other heating device that is capable of providing a controllable heating sequence is suitable to be used in the present invention. Some examples of such other heating devices are directly or indirectly heated fluidized bed, multiple-hearth, moving-bed furnaces or kilns, or tray ovens. The carbonized and oxidized product was activated at a temperature of approximately 1000° C. The resultant activated carbonaceous char was then cooled to room temperature under flowing nitrogen gas. Although nitrogen gas was used in this example, it is understood by persons skilled in the art that other inert gases; such as argon, helium, or carbon dioxide; may be used either singly or in combination with nitrogen in the present invention. The t-¾ time of the resultant char was then determined according to the method of Example 1 of U.S. Pat. No. 5,470,748. The Iodine Number of the same char was also determined according to Test Method number TM-4, Calgon Carbon Corporation, Pittsburgh, Pa. The results of the test are provided in Table 1.

EXAMPLE 2

The bituminous coal and 4% by weight pitch of Example 1 were combined with 10% by weight urea. The resultant mixture was then processed in the manner described in Example 1. The t-¾ time and Iodine Number of the resultant activated carbonaceous char were then determined according to the test methods described in Example 1. The results are given in Table 1. As shown in Table 1, the Iodine Number of the activated char of Example 2 is almost equal to that of Example 1 which indicates that the physical adsorption properties of both chars are very similar. Also, comparison of the t-¾ time of the activated char of Example 2 to that of Example 1 as provided in Table 1 shows that the catalytic activity of the char of Example 2 is much greater (i.e., lower t-¾ time) than that of Example 1. Therefore, the present invention, as practiced in Example 2, results in a significant improvement in catalytic activity of activated carbonaceous chars as compared to conventionally prepared chars as practiced in Example 1.

EXAMPLE 3

The bituminous coal and 4% by weight pitch of Example 1 were combined with 10 weight % melamine. The resultant mixture was then processed in the manner described in Example 1. The t-¾ time and Iodine Number of the resultant activated carbonaceous char were then determined according to the test methods described in Example 1. The results are provided in Table 1. As shown in Table 1, the Iodine Number of the activated char of Example 3 is almost equal to Example 1 which indicates that the physical adsorption properties of all three chars are very similar. Also, comparison of the t-¾ time of the activated char of Example 3 to that of Example 1 as given in Table 1 shows that the catalytic activity of the char of Example 3 is much greater (i.e., lower t-¾ time) than that of Example 1. Therefore, the present invention results in a significant improvement in catalytic activity of activated carbonaceous chars as compared to conventionally prepared chars. Also, the test results show that melamine is as effective as urea in the practice of the present invention.

TABLE 1

| Sample | Iodine No., mg/g | t-3/4, minutes |
| --- | --- | --- |
| activated char of Example 1 | 941 | 9.3 |
| activated char of Example 2 | 929 | 2.8 |
| activated char of Example 3 | 932 | 2.8 |

EXAMPLE 4

A bituminous coal, 4% (by weight) pitch, and 4% (by weight) ammonium sulfate were pulverized and subsequently briquetted. The briquettes were crushed and sized to approximately less than 6 mesh size and greater than 20 mesh size (U.S. Standard Series sieves). A portion of this material was heated in the presence of large quantities of excess air from 200° C. to 450° C. at a rate of 100° C./hour. The oxidized carbonized product was then activated at a temperature of approximately 1000° C. The resultant activated carbonaceous char was then cooled to room temperature under flowing nitrogen gas. The t-¾ time and Iodine Number were then determined according to the test methods described in Example 1. The results are given in Table 2.

EXAMPLE 5

A second portion of the sized material of Example 4 was heated in the presence of large quantities of excess air from 200° C. to 450° C. at a rate of 50° C./hour. Because of the difference in heating rates, the air exposure was double that of Example 4. All other conditions were the same. Therefore, the carbonized product is more highly oxidized than the carbonized and oxidized product of Example 4. The carbonized oxidized product was then activated at a temperature of approximately 1000° C. The resultant activated carbonaceous char was then cooled to room temperature under flowing nitrogen gas. As shown in Table 2, the Iodine Number of the activated chars of both examples are almost equal which implies that the physical adsorption properties of both chars are very similar. Also, the t-¾ time of the product of Example 5 is lower (i.e., higher catalytic activity) than the product of Example 4. Therefore, the requisite oxidation of the present invention was shown to have a significant effect on the development of catalytic activity of the resultant activated activated carbonaceous char. This example also shows that the resultant catalytic activities (as evidenced by the t-¾ times) of the activated carbonaceous chars of the present invention are dependent on, and increase with, the extent of oxidation.

TABLE 2

| Sample | Iodine No., mg/g | t-3/4, minutes |
|---|---|---|
| activated char of Example 4 | 1,131 | 16.9 |
| activated char of Example 5 | 1,126 | 6.0 |

EXAMPLE 6

A subbituminous coal was sized to approximately less than 6 mesh size and greater than 20 mesh size (U.S. Standard Series sieves). In the presence of large quantities of excess air, the sized material was carbonized and oxidized by heating from 100° C. to 200° C. at 200° C./hour, 200° C. to 250° C. at 33° C./hour, 250° C. for 4.5 hour, 250° C. to 450° C. at 200° C./hour. The carbonized and oxidized product was activated at a temperature of approximately 1000° C. The resultant activated carbonaceous char was then cooled to room temperature under flowing nitrogen gas. The t-¾ time and Iodine Number of the resultant activated carbonaceous char were determined according to the test methods described in Example 1. The results are provided in Table 3.

EXAMPLE 7

The subbituminous coal of Example 6 was sized according to the manner described in Example 6. The resultant sized material was then combined with an aqueous solution of urea and then dried at 105° C. The resultant dried material contained approximately 8% by weight urea. The resultant impregnated material was then thermally processed in the same manner described in Example 6. The t-¾ time and Iodine Number of the resultant activated activated carbonaceous char were determined according to the test methods described in Example 1. The results are given in Table 3. As shown in Table 3, the Iodine Number of the activated char of Example 7 is almost equal to that of Example 6 which indicates that the physical adsorption properties of both chars are very similar. Also, comparison of the t-¾ time of the activated char of Example 7 to that of Example 6 as provided in Table 3 shows that the catalytic activity of the char of Example 7 is much greater (i.e., lower t-¾ time) than that of Example 6. Therefore, the present invention, as practiced in Example 7, results in a significant improvement in the catalytic activity of the activated carbonaceous char as compared to the conventionally prepared char of Example 6.

TABLE 3

| Sample | Iodine No., mg/g | t-3/4, minutes |
|---|---|---|
| activated char of Example 6 | 569 | 33.7 |
| activated char of Example 7 | 561 | 9.7 |

EXAMPLE 8

Lignite coal was sized to approximately less than 6 mesh size and greater than 20 mesh size (U.S. Standard Series sieves). In the presence of large quantities of excess air, the sized material was carbonized and oxidized by heating from 100° C. to 200° C. at 200° C./hour, 200° C. to 250° C. at 33° C./hour, 250° C. for 4.5 hour, 250° C. to 450° C. at 200° C./hour. The carbonized and oxidized product was then activated at a temperature of approximately 1000° C. The resultant activated carbonaceous char was then cooled to room temperature under flowing nitrogen gas. The t-¾ time and Iodine Number of the resultant activated carbonaceous char were determined according to the test methods described in Example 1. The results are provided in Table 4.

EXAMPLE 9

The lignite coal of Example 8 was sized according to the manner described in Example 8. The resultant sized material was then combined with an aqueous solution of urea and then dried at 105° C. The resultant dried material contained approximately 8% by weight urea. The resultant dried material was then thermally processed in the manner described in Example 8. The t-¾ time and Iodine Number of the resultant activated carbonaceous char were determined according to the test methods described in Example 1 and are given in Table 4. As shown in Table 4, the Iodine Number of the activated char of Example 9 is almost equal to that of Example 8 which implies that the physical adsorption properties of both chars are very similar. Also, comparison of the t-¾ time of the activated char of Example 9 to that of Example 8 as given in Table 4 shows that the catalytic activity of the char of Example 9 is much greater (i.e., lower t-¾ time) than that of Example 8. Therefore, the present invention results in a significant improvement in catalytic activity of activated carbonaceous chars, as exemplified in Example 9, as compared to conventionally prepared chars, as exemplified in Example 8.

TABLE 4

| Sample | Iodine No., mg/g | t-3/4, minutes |
|---|---|---|
| activated char of Example 8 | 254 | 64.5 |
| activated char of Example 9 | 252 | 24.6 |

EXAMPLE 10

An anthracite coal and 19% (by weight) binders were pulverized. The resultant pulverized material was combined with water and formed into pellets with approximately 4 mm diameter. In the presence of large quantities of excess air, the pelletized material was carbonized and oxidized by heating from 80° C. to 300° C. at 132° C./hour, 300° C. to 480° C. at 108° C./hour, and then maintaining the temperature at 480° C. for 0.8 hour. The carbonized and oxidized product was then activated at a temperature of approximately 1000° C. The resultant activated carbonaceous char was then cooled to room temperature under flowing nitrogen gas. The t-¾ time and Iodine Number of the resultant activated carbonaceous char were determined according to the test methods described in Example 1. The results are shown in Table 5.

EXAMPLE 11

The pulverized mixture of anthracite coal and binders of Example 10 were combined with water and urea and formed into pellets with approximately 4 mm diameter. The urea content of the resultant pelletized material was 6.6% by weight. The pelletized material was subjected to the thermal processing as described in Example 10. The resultant activated carbonaceous char was then cooled to room temperature under flowing nitrogen gas. The t-¾ time and Iodine Number of the resultant activated carbonaceous char were determined according to the test methods described in Example 1. The results are shown in Table 5. As shown in Table 5, the Iodine Numbers of the activated chars of Examples 11 and 12 are almost equal, which indicates that the physical adsorption properties of both chars are very similar. Also, comparison of the t-¾ time of the high-temperature activated char of Example 11 to that of Example 10 shows that the catalytic activity of the char of Example 11 is much greater (i.e., lower t-¾ time) than that of Example 10. Therefore, the present invention results in a significant improvement to the catalytic activity of an activated carbonaceous char (Example 11) as compared to conventionally prepared char (Example 10) when the feedstock is anthracite coal. Furthermore, it is observed that this significant improvement can be obtained with other than granular materials.

TABLE 5

| Sample | Iodine No., mg/g | t-3/4, minutes |
| --- | --- | --- |
| activated char of Example 10 | 968 | 106 |
| activated char of Example 11 | 965 | 22.2 |

EXAMPLE 12

A bituminous coal and 4% (by weight) pitch were pulverized and subsequently briquetted. The resultant briquettes were crushed and sized to approximately less than 6 mesh size and greater than 20 mesh size (U.S. Standard Series sieves). In the presence of large quantities of excess air, the formed and sized material was carbonized and oxidized by heating from 200° C. to 450° C. at a rate of 50° C./hour and maintaining the temperature at 450° C. for two additional hours. The carbonized and oxidized product was activated at a temperature of approximately 1000° C. The resultant activated carbonaceous char was then cooled to room temperature under flowing nitrogen gas. The t-¾ time and Iodine Number of the resultant activated carbonaceous char were determined according to the test methods described in Example 1 and are provided in Table 6.

EXAMPLE 13

The bituminous coal and 4% (by weight) pitch of Example 12 were combined with 8% (by weight) of toluene di-isocyanate resin. The resin is a nitrogen-containing compound. The resultant mixture was then processed in the manner described in Example 12. The t-¾ time and Iodine Number of the resultant activated carbonaceous char were determined according to the test methods described in Example 12 and are provided in Table 6. As shown in Table 6, the Iodine Number of the activated char of Example 13 is almost equal to that of Example 12 which indicates that the physical adsorption properties of both chars are very similar. Also, comparison of the t-¾ time of the high-temperature activated char of Example 13 to that of Example 12 as set forth in Table 6 shows that the catalytic activity of the char of Example 13 is much greater (i.e., lower t-¾ time) than that of Example 12. Therefore, the present invention results in a significant improvement in catalytic activity of activated carbonaceous chars, as exemplified by Example 13, as compared to conventionally prepared chars, as exemplified by Example 12.

TABLE 6

| Sample | Iodine No., mg/g | t-3/4, minutes |
| --- | --- | --- |
| activated char of Example 12 | 844 | 7.1 |
| activated char of Example 13 | 870 | 3.2 |

The following examples 14 and 15 show the superior catalytic activity of a product of the present invention compared to that produced by a prior art method.

EXAMPLE 14

A bituminous coal and 4 weight % pitch were pulverized and subsequently briquetted. The resultant briquettes were crushed and sized to approximately less than 6 mesh size and greater than 20 mesh size (U.S. Standard Series sieves). In the presence of large quantities of excess air, the formed and sized material was carbonized and oxidized by heating from 150° C. to 450° C. at a rate of 150° C./hour and maintaining the temperature at 450° C. for two additional hours. The carbonized and oxidized product was then cooled, impregnated with an aqueous solution of urea, and then dried in a manner similar to that of Example 2 of U.S. Pat. No. 5,504,050. The resultant dried material contained approximately 7% by weight urea. The resultant urea-impregnated material was then activated at a temperature of approximately 1000° C. and then cooled to room temperature under flowing nitrogen gas. The t-¾ time of the resultant char was then determined according to the method of Example 1 of U.S. Pat. No. 5,470,748. The Iodine Number of the same char was also determined according to Test Method number TM-4, Calgon Carbon Corporation, Pittsburgh, Pa. The results are given in Table 7.

EXAMPLE 15

The bituminous coal and 4 weight % pitch of Example 14 were combined with 10 weight % urea and subsequently briquetted. The resultant briquettes were crushed and sized to approximately less than 6 mesh size and greater than 20 mesh size (U.S. Standard Series sieves). The resultant formed and sized material was then carbonized and oxidized, then urea impregnated and dried, then activated and cooled in the manner described in Example 14. The t-¾ time and Iodine Number of the resultant activated carbonaceous char were then determined according to the test methods described in Example 14. The results are provided in Table 7. As shown in Table 7, the Iodine Number of the activated char of Example 15 is comparable to that given in Example 14 which indicates that the physical adsorption properties of the two chars are very similar. Also, the catalytic activity of the char of Example 14 is high, as evidenced by the t-¾ time. However, comparison of the t-¾ time of the activated char of Example 15 to that of Example 14 as given in Table 7 shows that the catalytic activity of the char of Example 15 is even greater (i.e., lower t-¾ time) than that of Example 14. Therefore, the present invention, when practiced in combination with prior art methods that produce catalytically active chars, provides for higher catalytic activity than would otherwise result in the absence of the invention.

TABLE 7

| | Iodine No., mg/g | t-3/4, minutes |
| --- | --- | --- |
| activated char of Example 14 | 938 | 7.5 |
| activated char of Example 15 | 895 | 5.1 |

The following examples show the practice of the present invention using a variety of other carbon-containing feedstocks.

EXAMPLE 16

A German brown coal was crushed and sized to approximately smaller than 6 mesh and larger than 16 mesh (U.S. Standard Series sieves). The sized coal was dried in an oven at 105° C. for 3 hours. One part (by weight) of dried sized coal was impregnated with one part (by weight) of aqueous ammonium hydoxide solution (9.3–10 weight percent). The impregnated brown coal was air-dried at room temperature for approximately 16 hours. The air-dried impregnated brown coal was contacted with a flowing mixture of air and ammonia (approximate concentration of 14 volume percent) in a rotary kiln at a flow rate of about 2.2 liter/minute for every 100 g of the air-dried impregnated brown coal charged into the rotary kiln. The treatment was carried out at approximately 300° C. for 5 hours. Although air was used in this example as the oxidizing gas, other oxygen-containing gases may be used in place of or in combination with air in the present invention in an equivalent amount to achieve the same desired results. The treated brown coal was devolatized at approximately 700° C. for 10 minutes under a flowing stream of nitrogen gas. Although nitrogen was used in this example for the devolatization, it is understood by persons skilled in the art that other inert or oxygen-deficient gases may be used in place of or in combination with nitrogen. The devolatized product was then activated in steam at approximately 950° C. to three levels of apparent density ("AD"), as measured according to Test Method 7 of Calgon Carbon Corporation, Pittsburgh, Pa., to result in catalytically active carbonaceous chars. The t-¾ times of the chars were determined according to the method of Example 1 of U.S. Pat. No. 5,470,748 and are shown in Table 8.

TABLE 8

| Sample Identification | AD (g/cc) | t-3/4 (minutes) |
|---|---|---|
| 3197-79A | 0.299 | 1.6 |
| 3197-79B | 0.441 | 2.1 |
| 3197-79C | 0.368 | 1.7 |

EXAMPLE 17

Another portion of the sized oven-dried German brown coal of Example 16 was treated in a rotary kiln at approximately the same conditions as were used in Example 16. The treated brown coal was devolatized at approximately 700° C. for 10 minutes, then activated in steam at approximately 950° C. to produce catalytically active chars having various ADs. The results of the t-¾ time determination are shown in Table 9.

TABLE 9

| Sample Identification | AD (g/cc) | t-3/4 (minutes) |
|---|---|---|
| 3197-93A | 0.402 | 3.6 |
| 3197-93B | 0.340 | 2.5 |
| 3197-93C | 0.415 | 3.3 |
| 3197-93D | 0.283 | 2.8 |
| 3197-93E | 0.345 | 3.0 |

EXAMPLE 18

A Chinese brown coal was crushed and sized to smaller than 6 mesh and larger than 16 mesh (U.S. Standard Series sieves). The sized brown coal was dried in an oven at 105° C. for about 3 hours. The dried sized brown coal was treated in a rotary kiln in a flowing stream of a mixture of air and ammonia (approximate ammonia concentration of 14 volume percent) at an approximate flow rate of 1.2 liter/minute for each 100 g of dried brown coal initially charged into the rotary kiln. The treatment was carried out at approximately 300° C. for 9 hours. The treated brown coal was devolatized in a stream of nitrogen gas at approximately 700° C. for 10 minutes. The devolatized product was activated in steam at approximately 950° C. to various levels of apparent density. The t-¾ times of these activated products were measured and are shown in Table 10.

TABLE 10

| Sample Identification | AD (g/cc) | t-3/4 (minutes) |
|---|---|---|
| 3208-44A-1 | 0.609 | 3.5 |
| 3208-44A-2 | 0.551 | 2.6 |
| 3208-44A-3 | 0.513 | 2.0 |

EXAMPLE 19

The brown coal product treated with the air and ammonia mixture of Example 18 was directly activated in steam at approximately 950° C. to two different levels of apparent densities without being devolatized prior to activation. The t-¾ times of the activated products were measured and are shown in Table 11.

TABLE 11

| Sample Identification | AD (g/cc) | t-3/4 (minutes) |
|---|---|---|
| 3208-40A-1 | 0.417 | 2.0 |
| 3208-40A-2 | 0.388 | 1.9 |

EXAMPLE 20

A Chinese brown coal was crushed and sized to smaller than 6 mesh and larger than 16 mesh (U.S. Standard Series sieve). The sized brown coal was dried in an oven at approximately 105° C. for 3 hours. Two parts (by weight) of the sized oven-dried brown coal were impregnated with one part (by weight) of anhydrous ethylenediamine. The combined material was dried in air at room temperature for approximately 16 hours. The air-dried impregnated brown coal was treated in a rotary kiln at approximately 300° C. for 5 hours in a mixture of air and ammonia gas at an approximate flow rate of 1.5 liter/minute for every 100 g of impregnated brown coal charged into the kiln. This treated material was devolatized under flowing nitrogen gas at approximately 700° C. for 10 minutes. The devolatized product was activated steam at approximately 950° C. to various levels of apparent density. The t-¾ times of the activated products were determined and are shown in Table 12.

TABLE 12

| Sample Identification | AD (g/cc) | t-3/4 (minutes) |
|---|---|---|
| 3208-6X | 0.502 | 2.7 |
| 3208-6Y | 0.460 | 2.3 |
| 3208-6Z | 0.530 | 3.1 |

EXAMPLE 21

A bituminous coal and 4 percent (by weight of the bituminous coal) coal tar pitch were pulverized together. The resulting mixture was briquetted. The briquettes were crushed into granular particles smaller than approximately 6 mesh and larger than approximately 20 mesh (U.S. Standard Series sieve). The sized granular material was treated in a rotary kiln in a mixture of air and ammonia gas at an approximate flow rate of 1 liter/minute for every 100 g of the granular material. This treatment was carried out at approximately 300° C. for 5 hours, 350° C. for 0.5 hour, 400° C. for 0.5 hour, and 450° C. for 0.25 hour. The treated granular material was activated in steam at approximately 950° C. to various levels of apparent density. The t-¾ times of the activated products were determined and are shown in Table 13.

TABLE 13

| Sample Identification | AD (g/cc) | t-3/4 (minutes) |
| --- | --- | --- |
| 3224-4A | 0.586 | 6.9 |
| 3224-4B | 0.637 | 6.8 |
| 3224-4C | 0.670 | 7.6 |

EXAMPLE 22

A Wyoming subbituminous coal was crushed, sized to smaller than 6 mesh and larger than 16 mesh (U.S. Series sieve), and dried in oven at approximately 105° C. for 5 hours. One part (by weight) of the oven-dried coal was impregnated with 0.68 part (by weight) of aqueous ammonium hydroxide (concentration of 28–30 weight percent). The impregnated coal was dried in air at room temperature for about 16 hours. The impregnated and air-dried coal was treated in a rotary kiln at approximately 400° C. for 5 hours in a stream of air and ammonia gas at an approximate flow rate of approximately 1.9 liter/minute for every 100 g of the impregnated coal charged into the rotary kiln. The treated coal was activated in steam at approximately 950° C. to various levels of apparent density. The t-¾ times of the activated products were determined and are shown in Table 14.

TABLE 14

| Sample Identification | AD (g/cc) | t-3/4 (minutes) |
| --- | --- | --- |
| 3208-13A | 0.462 | 9.1 |
| 3208-13B | 0.327 | 9.5 |
| 3208-13C | 0.309 | 11.3 |
| 3208-13D | 0.305 | 6.7 |

While presently preferred embodiments of the invention have been described in detail, the invention may be otherwise embodied within the scope of the appended claims.

What is claimed is:

1. A process for the production of an activatable catalytic carbonaceous char which comprises the steps of (a) combining a carbon-containing material and a nitrogen-containing compound or material to produce a carbonaceous material, wherein said nitrogen-containing compound or material contains more nitrogen than said carbon-containing material, and said carbon-containing material provides more carbon to said combination than said nitrogen-containing compound or material provides to said combination, (b) carbonizing said carbonaceous material at temperatures less than 500° C., and (c) oxidizing said carbonized material after said carbonizing at temperatures less than 500° C.

2. A process for the production of an activatable catalytic carbonaceous char which comprises the steps of (a) combining a carbon-containing material and a nitrogen-containing compound or material to produce a carbonaceous material, wherein said nitrogen-containing compound or material contains more nitrogen than said carbon-containing material, and said carbon-containing material provides more carbon to said combination than said nitrogen-containing compound or material provides to said combination, (b) carbonizing and oxidizing said carbonaceous material at a temperature less than about 500° C.

3. The process of claim 1 or 2 wherein said step (a) occurs in the presence of ammonia.

4. A process as set forth in claim 1 or 2 further including the step of increasing the temperature of the carbonaceous char to above 500° C. to provide an activated catalytic char.

5. A process as set forth in claim 1 or 2 further including the steps of impregnating the carbonaceous char with a nitrogen-containing compound or material and increasing the temperature of the impregnated carbonaceous char to above 500° C. to provide an activated catalytic char.

6. The process of claim 4 wherein the step of increasing the temperature of the carbonaceous char to temperatures above 500° C. is conducted in an atmosphere comprising $H_2O$, $CO_2$, $NO_x$, $SO_x$, $O_2$ or combinations thereof to provide an activated catalytic char.

7. The process of claim 4 including the step of cooling said activated catalytic char to temperatures less than 400° C. under a substantially oxygen-free or otherwise inert atmosphere.

8. The process of claim 1 or 2 wherein said oxidizing is accomplished with any oxidizing agent containing oxygen.

9. The process of claim 5 wherein the step of increasing the temperature of the activated catalytic carbonaceous char to temperatures above 500° C. is conducted in an atmosphere comprising $H_2O$, $CO_2$, $NO_x$, $SO_x$, $O_2$ or combinations thereof.

10. The process of claim 5 including the step of cooling said activated catalytic carbonaceous char to temperatures less than 400° C. under a substantially oxygen-free or otherwise inert atmosphere.

11. The process of claim 4 wherein said nitrogen-containing compound or material is combined with other compounds or materials containing substantially no nitrogen.

12. The process of claim 1 or 2 wherein said nitrogen-containing compound or material has at least one nitrogen functionality in which the nitrogen exhibits an oxidation number of less than zero.

13. The process of claim 1 or 2 wherein said carbon-containing material is coal.

14. The process of claim 1 or 2 wherein said nitrogen-containing compound or material is selected from the group consisting of ammonia, ammonium hydroxide, ammonium salts, urea, melamine, amines, amides, nitrites, nitrosamines, cyanates, oximes, aniline, gelatin, polyacrylonitrile and mixtures thereof.

15. The process of claim 1 or 2 wherein said nitrogen-containing compound or material is combined with other compounds or materials containing substantially no nitrogen.

16. The process of claim 1 or 2 wherein said oxidizing is accomplished electrochemically.

17. The process of claim 4 wherein said nitrogen-containing compound or material is selected from the group consisting of ammonia, ammonium hydroxide, ammonium salts, urea, melamine, amines, amides, nitrites, nitrosamines, cyanates, oximes, aniline, gelatin, polyacrylonitrile and mixtures thereof.

18. The process of claim 6 including the step of cooling said activated catalytic carbonaceous char to temperatures less than 400° C. under a substantially oxygen-free or otherwise inert atmosphere.

* * * * *